United States Patent [19]

Unmuth et al.

[11] Patent Number: 4,584,089

[45] Date of Patent: Apr. 22, 1986

[54] BOROSILICATE-CONTAINING CATALYST AND REFORMING PROCESSES EMPLOYING SAME

[75] Inventors: Eugene E. Unmuth, Naperville; Louis C. Gutberlet, Wheaton, both of Ill.

[73] Assignee: Standard Oil Company (Indiana), Chicago, Ill.

[21] Appl. No.: 698,557

[22] Filed: Feb. 6, 1985

Related U.S. Application Data

[62] Division of Ser. No. 544,724, Oct. 24, 1983.

[51] Int. Cl.⁴ .............................................. C10G 35/06
[52] U.S. Cl. ..................................... 208/65; 208/138; 208/139
[58] Field of Search ........................... 208/138, 139, 65

[56] References Cited

U.S. PATENT DOCUMENTS

| | | | |
|---|---|---|---|
| 2,479,109 | 8/1949 | Haensel | 208/139 |
| 4,268,420 | 5/1981 | Klotz | 423/432 |

*Primary Examiner*—Curtis R. Davis
*Attorney, Agent, or Firm*—Robert E. Sloat; William T. McClain; Ralph C. Medhurst

[57] ABSTRACT

The catalyst comprises a physical particle-form mixture of a Component A and a Component B, said Component A comprising at least one Group VIII noble metal, preferably platinum, deposed on a solid catalyst support material providing acidic catalytic sites, said Component B consisting essentially of a crystalline borosilicate molecular sieve, and said catalyst having been prepared by thoroughly and intimately blending finely-divided particles of said Components A and B to provide a thoroughly-blended composite.

The catalyst can be employed suitably in hydrocarbon conversion processes. In particular, the catalyst can be employed in a process for the reforming of a hydrocarbon stream. More particularly, the catalyst can be used as the second catalyst in a two-catalyst reforming process.

9 Claims, 4 Drawing Figures

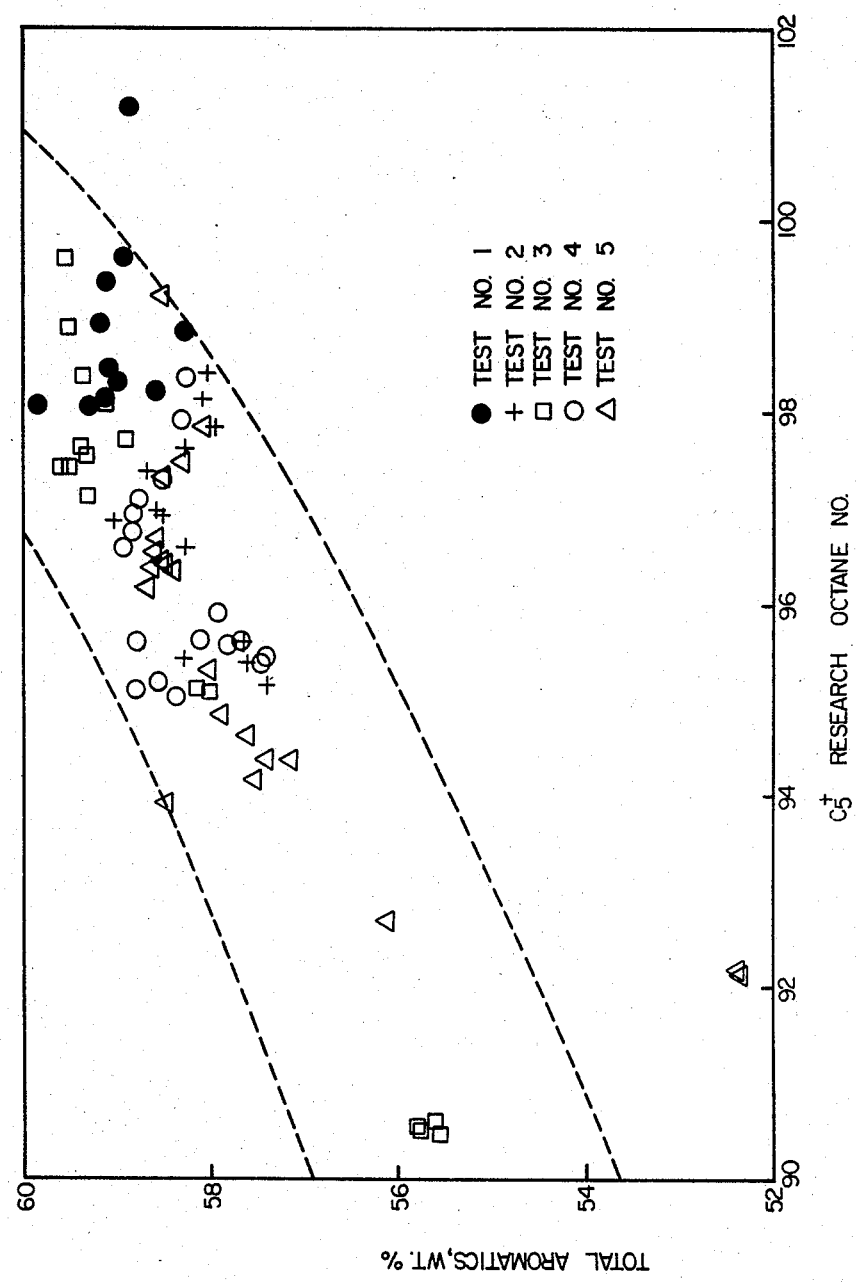

BOROSILICATE-CONTAINING CATALYST AND REFORMING PROCESSES EMPLOYING SAME

This is a division of application Ser. No. 544,724, filed Oct. 24, 1983.

BACKGROUND OF THE INVENTION

The reforming of petroleum hydrocarbon streams is one of the important petroleum refining processes that may be employed to provide high-octane number hydrocarbon blending components for gasoline. In the typical reforming process, the reactions comprise dehydrogenation reactions, isomerization reactions, and hydrocracking reactions. The dehydrogenation reactions include the dehydrogenation of cyclohexanes to aromatics, the dehydroisomerization of alkylcyclopentanes to aromatics, the dehydrogenation of paraffins to olefins, and the dehydrocyclization of paraffins and olefins to aromatics. The isomerization reactions include isomerization of n-paraffins to isoparaffins, the hydroisomerization of olefins to isoparaffins, the isomerization of alkylcyclopentanes to cyclohexanes, and the isomerization of substituted aromatics. The hydrocracking reactions include hydrocracking of paraffins and hydrodesulfurization. Adequate discussions of the reactions occurring in a reforming reaction zone are presented in CATALYSTS, Vol. VI, P. H. Emmett, editor, Reinhold Publishing Corporation, 1958, pages 497–498, and PETROLEUM PROCESSING, R. J. Hengstebeck, McGraw-Hill Book Company, Inc., 1959, pages 179–184.

It is well-known by those skilled in the art that several catalysts are capable of reforming petroleum naphthas and hydrocarbons that boil in the gasoline boiling range. Although reforming may be carried out through the use of molybdena-on-alumina catalysts, chromium-oxide-on-alumina catalysts, platinum-halogen-on-alumina catalysts, and platinum-aluminosilicate-material-alumina catalysts, the catalysts employing platinum as a hydrogenation component are generally employed today in the reforming processes of the petroleum industry.

Finely-divided crystalline aluminosilicate material can be used as a component in a catalyst that is employed for the reforming of hydrocarbon streams. For example, Bertolacini in U.S. Pat. No. 3,546,102, Bertolacini, et al., in U.S. Pat. No. 3,376,214, and Bertolacini, et al., in U.S. Pat. No. 3,376,215 teach the use of catalysts comprising a Group VIII noble metal and a solid support of crystalline mordenite-structure aluminosilicate material and an adsorbent refractory inorganic oxide, such as alumina, for the reforming of hydrocarbon streams. Moreover, in U.S. Pat. No. 4,325,808, Kim, et al., teach a hydrocarbon conversion catalyst system comprising a mixture of a first catalytic material containing a noble metal component deposed on a refractory inorganic oxide which is free of a crystalline aluminosilicate material and a second catalyst comprising at least one non-noble metal component deposed on a solid support comprising a cation-exchanged crystalline aluminosilicate material dispersed in a high surface area, porous refractory inorganic oxide and being free of a noble metal component. The crystalline aluminosilicate material can be natural or synthetic and can be suitably mordenite, faujasite, or ferrierite. Kim, et al., teach that such catalyst is suitable for the reforming of petroleum hydrocarbons. In U.S. Pat. No. 4,269,813, Klotz discloses crystalline borosilicates, their method of preparation, and their use to catalyze various processes, including isomerization, disproportionation, transalkylation, and reforming of hydrocarbon streams.

It is known that catalysts comprising physical particle-form mixtures of two or more components can be used to reform hydrocarbon streams, as shown in U.S. Pat. No. 4,302,358 by Pellet, et al., in U.S. Pat. No. 4,141,859, by Plank, et al., and in the above-discussed U.S. Pat. No. 4,325,808, by Kim, et al. In U.S. Pat. No. 4,302,358, Pellet, et al., disclose a catalyst comprising a physical particle-form mixture of a Component A and a Component B, wherein Component A comprises at least one Group VIII noble metal deposed on a solid catayst support material providing acidic catalytic sites and said Component B comprises rhenium or a compound of rhenium deposed on a solid catalyst support material, said catalysts having been prepared by thoroughly blending finely-divided particles having a particle diameter that is less than 100 mesh (150 microns), and forming the composite in particles having a size that is greater than 100 mesh (150 microns) and that such catalyst is suitable for the reforming of hydrocarbon streams. In U.S. Pat. No. 4,141,859, Plank, et al., disclose that a catalyst made up of a mixture of a conventional reforming catalyst and a crystalline aluminosilicate zeolite can be used as the second catalyst in a two-catalyst reforming system, that the catalyst can have as its molecular sieve component a member selected from the group consisting of ZSM-5, ZSM-35, and a mordenite-structure aluminosilicate material, and that the catalyst can be a physical particle-form mixture of the conventional reforming catalyst (platinum, rhenium, and combined halogen on an alumina support) and the crystalline aluminosilicate zeolite.

Now there has been found a catalyst comprising a physical particle-form mixture of a Component A comprising at least one Group VIII noble metal deposed on a solid catalyst support material providing acidic catalytic sites and a Component B comprising a crystalline borosilicate material and reforming processes employing such a catalyst; in particular, a reforming process wherein such catalyst is the second catalyst in a two-catalyst system.

SUMMARY OF THE INVENTION

Broadly, according to the present invention, there is provided a catalyst for the conversion of a hydrocarbon stream, particularly for the reforming of a hydrocarbon stream, which catalyst comprises a physical particle-form mixture of a Component A and a Component B, said Component A comprising at least one Group VIII noble metal deposed on a solid catalyst support material providing acidic catalytic sites and said Component B consisting essentially of a crystalline borosilicate molecular sieve, said catalyst having been prepared by thoroughly and intimately blending finely-divided particles of Component A and Component B to provide a thoroughly-blended composite. A suitable support material for Component A of the catalyst of the present invention comprises a refractory inorganic oxide, such as alumina, and a combined halogen, such as chlorine or fluorine. Typically, Component A is present in an amount within the range of about 75 wt% to about 99.9 wt%, based upon the catalyst weight, and Component B is present in an amount within the range of about 0.1 wt% to about 25 wt%. Preferably, Component A is present in an amount within the range of about 95 wt% to about 99.5 wt% and Component B is present in an amount within the range of about 0.5 wt% to about 5 wt%, each amount being based upon the weight of the catalyst.

According to the invention, there are also provided processes for the conversion of hydrocarbon streams. Specifically, there is provided a process for the reforming of a hydrocarbon stream, which process comprises contacting said stream in a reforming zone under reforming conditions and in the presence of hydrogen with the catalyst of the present invention. More specifically, there is provided a process for the reforming of a hydrocarbon stream, which process comprises contacting said hydrocarbon stream in a first reforming zone in the presence of hydrogen and under reforming conditions with a first catalyst to provide a partially-reformed effluent and contacting at least a portion of said partially-reformed effluent in a second reforming zone under reforming conditions and in the presence of hydrogen with a second catalyst to provide a reformed effluent having a high octane number, said first catalyst comprising at least one noble metal of Group VIII of the Periodic Table of Elements and a combined halogen on a porous, refractory inorganic oxide support and said second catalyst being the catalyst of the present invention.

BRIEF DESCRIPTION OF THE DRAWINGS

FIG. 4 compares the $C_5+$ aromatics yields obtained from the above test runs.

DESCRIPTION AND PREFERRED EMBODIMENT

Figure 1:
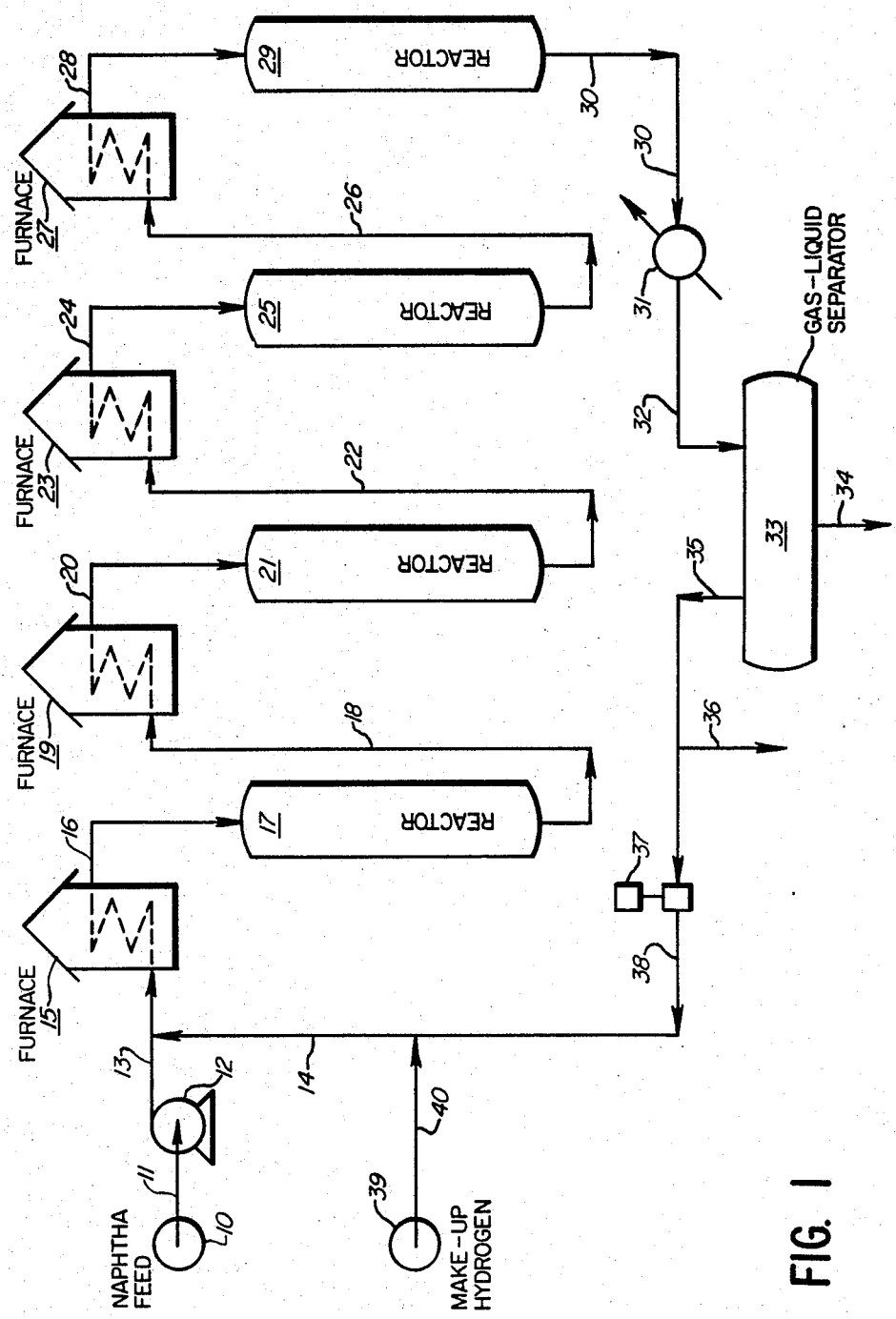
FIG. 1 presents a simplified schematic flow diagram of an embodiment of the process of the present invention, which embodiment employs the catalyst of the present invention.

The highly mechanized society of today requires an increasing demand for very high-octane number motor fuels. One of the chief processes for achieving such motor fuels is the reforming process. Typically, the reforming process of today is a process that employs a catalyst containing both platinum and rhenium as active metal components thereof. Such catalysts provide relatively long catalyst life interspersed with infrequent regenerations.

The process of the present invention is especially advantageous for the production of high-octane number blending components for motor fuels by means of the reforming of naphthas and other hydrocarbon streams boiling in the gasoline boiling range. It can be employed suitably to produce high-octane number blending components for unleaded and/or low-lead motor fuels.

The process of the present invention can be employed to reform a feedstock which is a member selected from the group consisting of a virgin naphtha, a cracked naphtha, a hydrocarbon fraction boiling in the gasoline boiling range, and mixtures thereof. It can be used also to reform partially-reformed naphthas and other hydrocarbon streams. A naphtha will exhibit a boiling range of about 21.1° C. (70° F.) to about 260° C. (500° F.), preferably, about 82° C. (180° F.) to about 204° C. (400° F.). The gasoline boiling range comprises temperatures of about 49° C. (120° F.) to about 216° C. (420° F.), preferably, about 60° C. (140° F.) to about 193° C. (380° F.). The partially-reformed hydrocarbon streams will exhibit an unleaded research octane number within the range of about 75 to about 95. As used herein, the term "partially-reformed" refers to those streams that have been reformed to an unleaded research octane number of about 75 to about 95.

Since many of the above feedstocks may contain appreciable amounts of nitrogen and sulfur compounds, which can be deleterious to the catalyst in a reforming process, such feedstock is often subjected to a suitable hydrodesulfurization and/or hydrodenitrogenation treatment, such as hydrofining, prior to the use of that particular feedstock in the process of the present invention. Such treatment reduces both the nitrogen and sulfur levels to tolerable limits.

Typical catalysts that can be used in the hydrodesulfurization and/or hydrodenitrogenation treatment comprise a suitable hydrogenation component, such as a Group VIB metal of the Periodic Table of Elements and/or a Group VIII metal of the Periodic Table of Elements, deposed on a suitable non-acidic or weakly-acidic support material, such as catalytically-active alumina. The Periodic Table of Elements referred to herein is the Periodic Table that appears on page 628 of WEBSTER'S SEVENTH NEW COLLEGIATE DICTIONARY, G. & C. Merriam Company, Springfield, Mass., U.S.A. (1963). Typical hydrogenation components are present in the elemental form, as oxides of the metals, as sulfides of the metals, or mixtures thereof. Examples of these pretreatment catalysts are compounds of cobalt and molybdenum on alumina and compounds of nickel and molybdenum on alumina.

Operating conditions for the hydrodesulfurization and/or hydrodenitrogenation treatment comprise an average temperature within the range of about 316° C. (600° F.) to about 399° C. (750° F.); a pressure within the range of about 1,480 kPa (200 psig) to about 3,546 kPa (500 psig); a liquid hourly space velocity (LHSV) within the range of about 1 volume unit of hydrocarbon per hour per volume unit of catalyst to about 5 volume units of hydrocarbon per hour per volume unit of catalyst; a hydrogen-to-hydrocarbon mole ratio within the range of about 1 to about 5; and a hydrogen addition rate within the range of about 17.8 m³/m³ (100 standard cubic feet of hydrogen per barrel of hydrocarbon [SCFB]) to about 89.0 m³/m³ (500 SCFB).

Broadly, according to the present invention, there is provided a catalyst for the conversion of a hydrocarbon stream, which catalyst comprises a physical particle-form mixture of a Component A and a Component B, said Component A comprising at least one Group VIII noble metal deposed on a solid catalyst support material providing acidic catalytic sites, said Component B consisting essentially of a crystalline borosilicate molecular sieve, and said catalyst having been prepared by thoroughly and intimately blending finely-divided particles of Component A and Component B to provide a thoroughly-blended composite.

Suitable Group VIII noble metals that can be used in Component A are the platinum group metals of Group VIII of the Periodic Table of Elements. The platinum group metals include platinum, palladium, rhodium, ruthenium, osmium, and iridium. The preferred Group VIII noble metal is platinum. One or more Group VIII noble metals can be employed. The Group VIII noble metal is present in an amount within the range of about 0.1 wt% to about 3 wt%, calculated as the element and based upon the weight of Component A. Preferably, the Group VIII noble metal is present in an amount within the range of about 0.2 wt% to about 2 wt%, calculated as the element and based upon the weight of Component A.

The support material for Component A is a material that provides acidic catalytic sites. Typically, it comprises a catalytically-active alumina and a combined halogen. Other possible support materials for Component A of the catalyst of the present invention can be selected from boria-alumina, titania-alumina, alumina-silica, boria-titania-alumina, and silica-magnesia.

Examples of suitable catalytically-active aluminas are gamma-alumina, eta-alumina, and mixtures thereof. Such alumina should have an average pore diameter of about 5 nm (50 Angstrom units [Ư]) to about 20 nm (200 Ư), or larger. The alumina should have a surface area of at least 150 m$^2$/gm. Suitably, the surface area of the alumina should be within the range of about 200 m$^2$/gm to about 800 m$^2$/gm.

The halogen of Component A can be either combined chlorine or combined fluorine. Preferably, the combined halogen is combined chlorine. The combined halogen is present in an amount within the range of about 0.1 wt% to about 4 wt%, calculated as the element and based upon the weight of the Component A. Preferably, the combined halogen is present in an amount within the range of about 0.2 wt% to about 1.5 wt%, calculated as the element and based upon the weight of the Component A.

Rhenium is an optional constituent of Component A. If employed, it is present in an amount within the range of about 0.1 wt% to about 3 wt%, calculated as the element and based upon the weight of Component A. Preferably, the rhenium, if used, is present in an amount within the range of about 0.2 wt% to about 2 wt%, calculated as the element and based upon the weight of Component A.

Component B of the catalyst of the present invention consists essentially of a crystalline borosilicate molecular sieve. An example of such borosilicate material is the AMS-1B crystalline borosilicate, which borosilicate comprises a molecular sieve material providing an X-Ray diffraction pattern comprising the following X-Ray diffraction lines and assigned strengths:

| Interplanar Spacing d, Å | Assigned Strength |
|---|---|
| 11.2 ± 0.2 | W-VS |
| 10.0 ± 0.2 | W-MS |
| 5.97 ± 0.07 | W-M |
| 3.82 ± 0.05 | VS |
| 3.70 ± 0.05 | MS |
| 3.62 ± 0.05 | M-MS |
| 2.97 ± 0.02 | W-M |
| 1.99 ± 0.02 | VW-M | and having the following composition in terms of mole ratios of oxides:

$$0.9 \pm 0.2 M_{2/n}O:B_2O_3:YSiO_2:ZH_2O,$$

wherein M is at least one cation having a valence of n, Y is a value within the range of about 4 to about 600, and Z is a value within the range of 0 to about 160.

Typically, AMS-1B crystalline borosilicates can be prepared by (1) preparing a mixture of a material containing, for example, an oxide of silicon, an oxide of boron, an alkylammonium cation or a precursor of an alkylammonium cation, a hydroxide of an alkali metal or an alkaline earth metal, or an organic amine or organic diamine, and water; and (2) maintaining the mixture at suitable reaction conditions to effect the formation of the borosilicate. Suitable reaction conditions comprise a reaction temperature within the range of about 25° C. to about 300° C., a pressure of at least the vapor pressure of water at the reaction temperature, and a reaction time that is sufficient to effect crystallization.

Additional description of such borosilicates and details directed to their preparation and use are presented in U.S. Pat. Nos. 4,269,813 and 4,285,919 and published European Patent Application No. 68,796, each of which is incorporated herein by reference. The hydrogen form of AMS-1B crystalline borosilicate is preferred for the catalyst of the present invention.

The catalyst of the present invention contains Component A in an amount within the range of about 75 wt% to about 99.9 wt% and Component B in an amount within the range of about 0.1 wt% to about 25 wt%, each amount being based upon the weight of the catalyst. Preferably, Component A is present in an amount within the range of about 95 wt% to about 99.5 wt% and Component B is present in an amount within the range of about 0.5 wt% to about 5 wt%.

The catalyst of the present invention can be prepared typically by first forming Component A, thoroughly and intimately blending finely-divided particles of Components A and B to provide a thoroughly-blended composite, and forming said composite into particles that are suitable for use in a hydrocarbon conversion reaction zone.

Component A is prepared by incorporating at least one Group VIII noble metal into the selected catalyst support material by impregnation of that support material or by addition of a soluble compound of the metal to a sol or gel of the support material, if the support material is a refractory inorganic oxide, thoroughly blending the mixture, co-gelling the mixture, drying, and calcining. If a combined halogen is to be employed, it can be added in a similar manner. If both the Group VIII noble metal and the combined halogen are used, the halogen can be added prior to, after, or simultaneously with the Group VIII noble metal. In addition, if rhenium is used, it can be impregnated into the supports material in a similar manner. Therefore, the particular metals and halogen, if used, can be impregnated into the support material or soluble compounds of the metals and the halogen can be added to a sol or gel of the refractory inorganic oxide. In the latter instance, the resulting composite is thoroughly blended, the sol or gel mixture is subsequently co-gelled by the addition of a dilute ammonia solution, and the resulting co-gelled material is dried and calcined.

In the case when the refractory inorganic oxide is gelled, dried, calcined, and cooled, and the resulting material is impregnated with one or more solutions of the various metal components and the halogen, if used, suitable calcination conditions comprise a temperature in the range of about 482° C. (900° F.) to about 593° C. (1,100° F.) and a calcination time within the range of about one hr to about 20 hr. Suitable drying conditions comprise a temperature in the range of about 93° C. (200° F.) to about 204° C. (400° F.) and a drying time of about three hr to about 30 hr. Preferably, drying conditions comprise a temperature of about 121° C. (250° F.) for about 8 hr to about 16 hr and calcination conditions comprise a temperature of about 538° C. (1,000° F.) for about two hr. The combined halogen can be incorporated into the catalyst as a halide of the Group VIII noble metal, as a halogen acid, or as a halide salt, or the catalyst can be halogenated by in situ treatments by a halogen gas or an organic halide.

A mechanical mixture of finely-divided particles of Components A and B is prepared. Appropriately-sized particles of each component, i.e., particles having a diameter that is less than 100 mesh [U.S. Sieve Series] (150 microns), are added to one another and are thoroughly blended to form a thoroughly-blended composite, which in turn is formed into particles that are suitable for use in a hydrocarbon conversion reaction zone. Typically, the latter particles have a size that is greater than 100 mesh [U.S. Sieve Series] (150 microns). The particles of Components A and B can be thoroughly and intimately blended by using techniques, such as mulling or ball-milling, which are well-known in the art.

A suitable procedure for making such a finished catalyst comprises forming cylindrical pellets from the thoroughly-blended composite by extrusion, and charging the extruded pellets into a Marumerizer, wherein the pellets are transformed into uniformly-sized spheres by means of a rolling motion resulting from centrifugal force and friction.

The Marumerizer (a registered trademark) is a machine consisting of a non-movable bowl inside of which bowl is a specially-machined rotating friction plate. It can be obtained from Elanco Products Company, Equipment Sales Department, a Division of Eli Lilly and Company.

It is to be understood that the use of a Marumerizer is suggested solely for illustrative purposes and is not intended to limit the scope of the present invention. Other methods known in the art can be used to form larger particles comprising a thoroughly-blended composite of smaller particles. The larger particles can be made in the shape of extrudates, pills, pellets, beads, spheres, or other shaped particles of the desired size.

The catalyst of the present invention can be used for the conversion of hydrocarbon streams. Specifically, it can be used to reform hydrocarbon streams. Suitably, it can be presulfided prior to its use according to sulfiding techniques recognized in the art.

Broadly, according to the present invention, there is provided also a process for the conversion of a hydrocarbon stream, which process comprises contacting said stream under hydrocarbon conversion conditions and in the presence of hydrogen with a catalyst comprising a physical particle-form mixture of a Component A and a Component B, said Component A comprising at least one Group VIII noble metal deposed on a solid catalyst support material providing acidic catalytic sites, said Component B consisting essentially of a crystalline borosilicate molecular sieve, said catalyst having been prepared by thoroughly and intimately blending finely-divided particles of said Components A and B to provide a thoroughly-blended composite, and said Component B being present in an amount within the range of about 0.1 wt% to about 25 wt%, based upon the weight of said catalyst.

More particularly, there is provided a process for the reforming of a hydrocarbon stream, which process comprises contacting said stream under reforming conditions and in the presence of hydrogen with a catalyst comprising a physical particle-form mixture of a Component A and a Component B, said Component A comprising at least one Group VIII noble metal deposed on a solid catalyst support material providing acidic catalytic sites, said Component B consisting essentially of a crystalline borosilicate molecular sieve, said catalyst having been prepared by thoroughly and intimately blending finely-divided particles of said Components A and B to provide a thoroughly-blended composite, and said Component B being present in an amount within the range of about 0.1 wt% to about 25 wt%, based upon the weight of said catalyst.

In addition, there is provided a process for the reforming of a hydrocarbon stream, which process comprises contacting said hydrocarbon stream in a first reforming zone in the presence of hydrogen and under reforming conditions with a first catalyst to provide a partially-reformed effluent and contacting at least a portion of said partially-reformed effluent in a second reforming zone under reforming conditions and in the presence of hydrogen with a second catalyst to provide a reformed effluent having a high octane number, said first catalyst comprising at least one noble metal of Group VIII of the Periodic Table of Elements and a combined halogen on a porous, refractory inorganic oxide support, said second catalyst comprising a physical particle-form mixture of a Component A and a Component B, said Component A comprising at least one noble metal of Group VIII deposed on a solid catalyst support material providing acidic catalytic sites, said Component B consisting essentially of a crystalline borosilicate molecular sieve, said catalyst having been prepared by thoroughly and intimately blending finely-divided particles of said Components A and B to provide a thoroughly-blended composite, and said Component B being present in an amount within the range of about 0.1 wt% to about 25 wt%, based upon the weight of said second catalyst.

In the case of the embodiment of the reforming process wherein two catalysts are employed, the improvement comprises using as the second reforming catalyst the catalyst of the present invention.

Therefore, according to the present invention, there is provided in a process for the reforming of a hydrocarbon stream selected from the group consisting of a virgin naphtha, a cracked naphtha, a hydrocarbon fraction boiling in the gasoline boiling range, and mixtures thereof, wherein said stream is first contacted in a first reaction zone with a first reforming catalyst under reforming conditions and in the presence of hydrogen to provide a partially-reformed effluent and at least a portion of said partially-reformed effluent is contacted in a second reaction zone under reforming conditions and in the presence of hydrogen with a second reforming catalyst comprising a Group VIII noble metal and a crystalline molecular sieve to provide a reformate having a high octane number, the improvement which comprises using as said second reforming catalyst a catalyst comprising a physical particle-form mixture of a Component A and a Component B, said Component A comprising at least one Group VIII noble metal deposed on a solid catalyst support material providing acidic catalytic sites, said Component B consisting essentially of a crystalline borosilicate molecular sieve, and said catalyst having been prepared by thoroughly and intimately blending finely-divided particles of said Components A and B to provide a thoroughly-blended composite.

Typical operating conditions that can be used in the reforming processes of the present invention comprise an inlet temperature within the range of about 399° C. (750° F.) to about 549° C. (1,020° F.), a pressure within the range of about 446 kPa (50 psig) to about 6,996 kPa (1,000 psig), a weight hourly space velocity (WHSV) within the range of about 0.5 weight unit of hydrocarbon per hour per weight unit of catalyst to about 10 weight units of hydrocarbon per hour per weight unit of catalyst, a hydrogen recycle rate within the range of about 267 m$^3$/m$^3$ (1,500 SCFB) to about 2,670 m$^3$/m$^3$ (15,000 SCFB), and a hydrogen-to-hydrocarbon mole ratio within the range of about 1 to about 30. Preferred operating conditions comprise an inlet temperature within the range of about 504° C. (940° F.) to about 527° C. (980° F.), a pressure within the range of about 446 kPa (50 psig) to about 2,170 kPa (300 psig), a WHSV within the range of about 1 weight unit of hydrocarbon per hour per weight unit of catalyst to about 8 weight units of hydrocarbon per hour per weight unit of catalyst, a hydrogen recycle rate within the range of about 534 m$^3$/m$^3$ (3,000 SCFB) to about 1,780 m$^3$/m$^3$ (10,000 SCFB), and a hydrogen-to-hydrocarbon mole ratio within the range of about 4 to about 25.

The processes of the present invention can be carried out in any of the conventional types of equipment known in the art. One can, for example, employ catalysts in the form of pills, pellets, granules, broken fragments, or various special shapes, disposed as one or more fixed beds within one or more reaction zones, and the charging stock may be passed therethrough in the liquid, vapor, or mixed phase, and in either upward or downward flow. Alternatively, the catalyst may be in a suitable form for use in moving beds, in which the charging stock and catalyst are preferably passed in countercurrent flow; or in fluidized-solid processes, in which the charging stock is passed upward through a turbulent bed of finely-divided catalyst; or in the suspensoid process, in which the catalyst is slurried in the charging stock and the resulting mixture is conveyed into the reaction zone. A fixed-bed reforming process is exemplified by Ultraforming (PETROLEUM ENGINEER, Vol. XXVI, No. 4, April, 1954, at page C-35). The reaction products from the foregoing processes are removed from the reaction zones and fractionated to recover the various components thereof. The hydrogen and unconverted materials are recycled as desired, the excess hydrogen produced in a reformer conveniently being utilized in the hydrodesulfurization of the feed, if such hydrodesulfurization is needed.

Unwanted products in the reforming of petroleum hydrocarbon streams are light hydrocarbon gases and coke. Such products and other compounds, such as polynuclear aromatics and heavy hydrocarbons, may result in coke. As the operation progresses, a substantial amount of coke accumulates on the surface of the catalyst resulting in an increasingly rapid rate of catalyst deactivation. Consequently, the coke must be removed periodically from the surface of the catalyst. Such coke removal may be accomplished through a coke-burn treatment wherein the coked catalyst is contacted with an oxygen-containing gas at selected temperatures. Typically, the gas will contain oxygen within the range of about 1 vol% to about 21 vol%. The concentration of oxygen in the gas should be maintained at a level which will result in the production of temperatures that will not be in excess of 593° C. (1,100° F.), preferably, not in excess of 566° C. (1,050° F.).

Typically, the process of the present invention can be employed as a semi-regenerative reforming process or as a regenerative or cyclic process. In a semi-regenerative reforming process, the flow of hydrocarbons is stopped to all of the reactors in the system and the catalyst in each of the reactors is regenerated. In a regenerative or cyclic reforming system, one of the reactors is removed from the system and is replaced by an auxiliary reactor. Reforming of hydrocarbons continues in such a system, while catalyst in the reactor that has been removed from the system is regenerated. The auxiliary reactor is known as a swing reactor.

A preferred embodiment of the process of the present invention is depicted in the accompanying FIG. 1. This figure is a simplified schematic flow diagram of the preferred embodiment. It does not include certain auxiliary equipment, such as heat exchangers, valves, pumps, compressors, and associated equipment, which would be needed in various places along the flow path of the process in addition to the pump and compressor that are depicted in the drawing. Such additional auxiliary equipment and its location requirements would be quickly recognized by one having ordinary skill in the art. Consequently, such auxiliary equipment is not shown in the figure.

In the embodiment of the process of the present invention that is represented in the accompanying Fig. 1, which embodiment is not intended to limit the scope of the present invention, a naphtha having a boiling range of about 71° C. (160° F.) to about 204° C. (400° F.), preferably, about 82° C. (180° F.), to about 193° C. (380° F.), is obtained from source 10. This naphtha contains 1 ppm sulfur. This feedstock is passed through line 11 into pump 12, which pumps the hydrocarbons through line 13. Hydrogen-containing recycle gas is introduced into line 13 via line 14 to be mixed with the hydrocarbons in line 13. The resulting hydrogen-hydrocarbon mixture passes through line 13, furnace 15, and line 16 into the top of reactor 17. The material is introduced into reactor 17 at a temperature of about 504° C. (940° F.) to about 527° C. (980° F.). The outlet temperature of reactor 17 is approximately 427° C. (800° F.) and the pressure in reactor 17 is within the range of about 896 kPa (115 psig) to about 2,275 kPa (315 psig).

The effluent from reactor 17 passes through line 18, furnace 19, and line 20 into the top of reactor 21. Sufficient heat is introduced into this hydrogen-hydrocarbon stream by furnace 19 so that the temperature at the inlet of reactor 21 is about 516° C. (960° F.) to about 538° C. (1,000° F.) The outlet temperature of reactor 21 is approximately 457° C. (855° F.) and the pressure in reactor 21 is within the range of about 862 kPa (110 psig) to about 2,240 kPa (310 psig).

The effluent from reactor 21 passes through line 22, furnace 23, and line 24 into the top of reactor 25. This effluent is heated in furnace 23 so that the inlet temperature of reactor 25 is about 516° C. (960° F.) to about 538° C. (1,000° F.). The outlet temperature of reactor 25 is approximately 504° C. (940° F.) and the pressure in reactor 25 is within the range of about 827 kPa (105 psig) to about 2,206 kPa (305 psig).

The effluent from reactor 25 passes through line 26, furnace 27, and line 28 into the top of reactor 29. This hydrocarbon effluent is heated in furnace 27 so that the inlet temperature of reactor 29 is about 527° C. (980° F.) to about 549° C. (1,020° F.). The outlet temperature of reactor 29 is about 510° C. (950° F.) and the pressure in reactor 29 is within the range of about 791 kPa (100 psig) to about 2,170 kPa (300 psig).

Reactors 17, 21, and 25 all contain a catalyst which has been presulfided and which is a catalyst which comprises about 0.05 wt% to about 1 wt% platinum, about 0.1 wt% to about 1.5 wt% combined halogen, preferably chlorine, and optionally about 0.1 wt% to about 1.5 wt% rhenium on a solid support of catalytically-active alumina, all amounts being expressed in terms of the element and based upon the weight of the catalyst. Reactor 29 contains a second catalyst, an embodiment of the catalyst of the present invention, which second catalyst comprises a physical particle-form mixture of Components A and B, said Component A comprising about 0.1 wt% to about 3 wt% platinum and about 0.1 wt% to about 4 wt% combined chlorine deposed on gamma-alumina, said Component B consisting essentially of a crystalline borosilicate molecular sieve, said catalyst having been prepared by thoroughly and intimately blending finely-divided particles of Component A and Component B to provide a thoroughly-blended composite, and said Component B being present in an amount within the range of about 0.5 wt% to about 5 wt%, based upon the weight of the second catalyst. The catalysts are in the form of ⅛-in×⅛-in pellets.

Not shown in the figure is a fifth reactor, which reactor contains a quantity of either of the catalysts or mixture of the two that are employed in the other reactors. This additional reactor is employed as a swing reactor for each of the four reactors in this system, when the catalyst in a particular reactor has become deactivated and must be regenerated. The reactor containing this deactivated catalyst is removed from the system and is replaced by the swing reactor in order that the reforming system may be operated continuously, even though the deactivated catalyst has been removed from the system and is being regenerated.

The hydrogen-to-hydrocarbon ratio and the WHSV employed in the various reactors fall within the respective ranges and values as expressed hereinabove.

The effluent from reactor 29 passes through line 30, water cooler 31, and line 32 into gas-liquid separator 33. Gas-liquid separator 33 is operated at a pressure of about 653 kPa (80 psig) to about 1,756 kPa (240 psig) and at a temperature of about 38° C. (100° F.). Liquid product is removed from separator 33 through line 34 to be sent to a suitable product recovery system from which a high-octane product is obtained. Gaseous material is removed from separator 33 through line 35. A portion of this gas is removed from the system through line 36 to be used at other refinery units. The remainder of the hydrogen-hydrocarbon gas in line 35 is compressed by compressor 37 to be sent through lines 38 and 14 as hydrogen-hydrocarbon recycle gas. When necessary, make-up hydrogen gas may be introduced into the system from source 39 via line 40.

The following examples are presented to facilitate a better understanding of the present invention. They are presented for the purpose of illustration only and are not intended to limit the scope of the present invention.

EXAMPLE I

A commercially prepared reforming catalyst was obtained from the American Cyanamid Company as 1/10-in (diameter)×3/16-in (length) extrudates and contained 0.39 wt% platinum, 0.42 wt% rhenium, and 0.92 wt% combined chlorine on a support of gamma-alumina. This catalyst is identified hereinafter as Catalyst I.

EXAMPLE II

A catalyst containing a small amount of the hydrogen form of AMS-1B crystalline borosilicate material was prepared as an embodiment of the catalyst of the present invention. This catalyst is identified hereinafter as Catalyst II.

A 1,000-gm portion of Catalyst I was ground to a fine-mesh material in a Retch grinding mill, that was obtained from Brinkmann Instruments Company. This material was screened to pass through a 325-mesh screen (U.S. Sieve Series).

To 148.5 gm of the ground Catalyst I were added 1.5 gm of the hydrogen form of an AMS-1B crystalline borosilicate material. This borosilicate material, a commercially-prepared material, was in the form of 325-mesh material. X-ray analysis indicated that this AMS-1B material was about 90% crystalline. The following Table I presents the significant interplanar spacings, associated relative intensities ($I/I_o$), and assigned strengths that were found in its X-ray diffraction pattern, which spacings and associated information identify the material as being AMS-1B borosilicate molecular sieve material.

TABLE I

CONDENSED X-RAY PATTERN FOR AMS-1B BOROSILICATE

| Interplanar Spacing d, Å | $I/I_o$ | Assigned Strength |
|---|---|---|
| 11.16 | 43 | MS |
| 10.0 | 32 | M |
| 5.97 | 12 | W |
| 3.83 | 100 | VS |
| 3.71 | 45 | MS |
| 3.63 | 29 | M |
| 2.97 | 17 | W |
| 1.98 | 18 | W |

The ground catalyst and crystalline borosilicate material were blended thoroughly in a ball mill for 3 hr. During this blending, 7.5 gm of Sterotex (a registered trade name) pelletizing aid were added. The resulting blended finely-divided material was pelletized into ⅛-in diameter pills in a Stokes pelletizer obtained from Penwalt-Stokes Company. The pills were then calcined in air for 3 hr at a temperature of 538° C. (1,000° F.). This calcined material, Catalyst II, was prepared to contain 0.39 wt% platinum, 0.42 wt% rhenium, 0.92 wt% combined chlorine, and 1.0 wt% crystalline AMS-1B borosilicate material.

EXAMPLE III

Catalyst I and Catalyst II were tested in a bench-scale pilot plant test unit, which was an isothermal multibed unit employing once-through hydrogen. Weight balances were obtained two to three times daily under automatic control. The hydrocarbon feed and once-through hydrogen were introduced into the reactor. In the case of Catalyst I, four beds of catalyst were employed, while in the case of the test using Catalyst II, four beds of Catalyst I were employed and these beds were followed by one bed of Catalyst II. Hence, Catalyst II was used as a tail-reactor catalyst.

During the course of a run, the liquid product was stabilized continuously in a small stripping column. The off-gas was analyzed by an on-line gas chromatograph and was averaged by computer over the test period. Axial temperature scans were taken continuously during the test and were averaged by computer. The liquid product was analyzed off-line by gas chromatograph and research octane numbers were obtained by the conventional ASTM engine test.

In each test run, a reactor having an inside diameter of 0.622 in was employed. The catalyst beds were approximately 5-in long.

Catalyst II was tested as a tail-reactor catalyst in Test No. 1. For this test, the catalyst was loaded as presented hereinbelow in Table II.

TABLE II

| CATALYST LOADING FOR TEST NO. 1 | | |
|---|---|---|
| Bed | Catalyst | Wt, gm |
| 1 | I | 0.5 |
| 2 | I | 3.0 |
| 3 | I | 13.5 |
| 4 | I | 14.5 |
| 5 | II | 3.5 |

The catalyst section of the reactor consisted of four separately-controlled heating zones which were approximately 5 in long. Because of the highly endothermic nature of reforming, the catalysts in the first three beds were diluted with 3 mm-diameter glass beads to aid isothermal control. The fourth bed was not diluted. When five beds were used, both the fourth and fifth beds were packed into the fourth (last) heating zone.

The catalyst was heated to a temperature of 482° C. (900° F.) in the test unit by passing flowing air through the catalyst beds for a period of approximately 1 hr. Then the test system was purged with flowing nitrogen for approximately 15 min and hydrogen flow was established at the rate of 7.5 SCFH. The catalyst was then presulfided with dimethyl disulfide, which was added in both an up-flow and a down-flow manner. This presulfiding was conducted to sulfide the catalyst to a sulfur level of about 0.04 wt%. Then the catalyst in the system was reduced in flowing hydrogen for approximately 1 hr at a temperature of about 482° C. (900° F.). After the one-hour reduction, a Mid-Continent naphtha was introduced into the system in an amount that would provide a WHSV of about 5.6 gm of hydrocarbons per hour per gm catalyst. This feed is identified hereinafter as Feed A and has the properties presented hereinbelow in Table III.

TABLE III

| PROPERTIES OF FEED A | | |
|---|---|---|
| Gravity, °API | | 55.9 |
| Specific Gravity | | 0.7168 |
| Coulometric Sulfur, ppm | | 3 |
| Hydrocarbon Type, vol % | | |
| Paraffins | | 53.6 |
| Naphthenes | | 34.0 |
| Aromatics | | 12.4 |
| Research Octane No. | | 49.4 |
| ASTM Distillation | | |
| % Off | °C. | °F. |
| IBP | 73 | 164 |
| 10 | 103 | 217 |
| 30 | 116 | 240 |
| 50 | 127 | 260 |
| 70 | 143 | 290 |
| 90 | 164 | 326 |
| EP | 193 | 380 |

After the naphtha flow was established, the reactor temperature was increased to 510° C. (950° F.). Test No. 1 was then conducted at the operating conditions presented hereinbelow in Table IV. In addition, the results obtained from Test No. 1 are presented in Table IV. In each table of data presented hereinafter, the term "Temp" represents the kinetic average temperature, which is discussed by Malloy, et al., in "Equivalent Isothermal Temperatures for Nonisothermal Reactors" on pages 528 through 530 of the *A.I.Ch.E. Journal*, Vol. 1, No. 4 (December, 1955).

TABLE IV

| DATA FROM TEST NO. 1 | | | | | | | | | | | |
|---|---|---|---|---|---|---|---|---|---|---|---|
| Period No. | 1 | 2 | 3 | 4 | 5 | 6 | 7 | 9 | 10 | 11 | 12 |
| Period Length, hr | 4.0 | 3.9 | 3.9 | 3.9 | 3.9 | 3.9 | 3.8 | 2.9 | 4.9 | 4.9 | 4.9 |
| Time on Oil, hr | 5.6 | 11.5 | 17.5 | 23.3 | 29.6 | 35.5 | 41.4 | 48.4 | 60.5 | 72.5 | 84.5 |
| Operating Conditions | | | | | | | | | | | |
| Pressure, psig | 301.9 | 301.9 | 301.8 | 301.9 | 301.9 | 301.9 | 301.9 | 301.8 | 302.0 | 301.9 | 301.9 |
| Recycle Gas Rate, SCFB | 4605. | 4601. | 4593. | 4585. | 4605. | 4641. | 4620. | 4645. | 4627. | 4605. | 4602. |
| H$_2$ Partial Pressure, psia | 266.9 | 266.8 | 266.7 | 266.7 | 266.9 | 267.2 | 267.0 | 267.1 | 267.2 | 266.9 | 266.8 |
| HC Partial Pressure, psia | 49.7 | 49.7 | 49.8 | 49.8 | 49.7 | 49.3 | 49.5 | 49.3 | 49.5 | 49.7 | 49.7 |
| H/HC Ratio | 5.4 | 5.4 | 5.4 | 5.4 | 5.4 | 5.4 | 5.4 | 5.4 | 5.4 | 5.4 | 5.4 |
| WHSV | 5.6 | 5.6 | 5.6 | 5.6 | 5.6 | 5.6 | 5.6 | 5.6 | 5.6 | 5.6 | 5.6 |
| Temp, °F. | 952.2 | 952.0 | 951.0 | 951.8 | 952.6 | 952.2 | 952.3 | 951.7 | 952.4 | 952.0 | 951.9 |
| Wt % Recovery | 97.4 | 98.0 | 98.5 | 98.2 | 98.7 | 98.3 | 98.5 | 98.8 | 100.0 | 98.7 | 100.2 |
| C$_5$+ Research Octane No. | 101.2 | 99.6 | 99.3 | 98.9 | 98.5 | 98.3 | 98.2 | 98.0 | 98.2 | 98.1 | 98.8 |
| C$_5$+ Yields, wt % | 79.6 | 80.8 | 81.6 | 82.1 | 82.6 | 83.0 | 83.3 | 83.6 | 81.3 | 83.6 | 79.8 |
| Total Aromatics, wt % | 59.0 | 59.0 | 59.2 | 59.2 | 59.1 | 59.1 | 59.2 | 59.3 | 58.6 | 59.9 | 58.3 |

EXAMPLE IV

A second test, Test No. 2, was made and this second test also employed Catalyst II as a tail-reactor catalyst. The loading of catalyst for Test No. 2 is summarized in Table V hereinbelow.

TABLE V

| CATALYST LOADING FOR TEST NO. 2 | | |
|---|---|---|
| Bed | Catalyst | Wt, gm |
| 1 | I | 0.5 |
| 2 | I | 3.0 |
| 3 | I | 13.5 |
| 4 | I | 9.0 |
| 5 | II | 9.0 |

The catalyst pretreatment and testing that were conducted for Test No. 2 were similar to the pretreatment and testing performed in Test No. 1. The operating conditions and test results are summarized hereinbelow in Table VI.

TABLE VI

DATA FROM TEST NO. 2

| Period No. | 1 | 2 | 3 | 4 | 5 | 6 | 7 |
|---|---|---|---|---|---|---|---|
| Period Length, hr | 3.9 | 3.9 | 3.9 | 4.9 | 4.9 | 4.9 | 4.9 |
| Time on Oil, hr | 5.5 | 11.5 | 17.5 | 24.0 | 35.9 | 47.9 | 59.9 |
| Operating Conditions | | | | | | | |
| Pressure, psig | 303.7 | 303.7 | 303.7 | 303.7 | 303.7 | 303.7 | 303.7 |
| Recycle Gas Rate, SCFB | 4540. | 4549. | 4532. | 4538. | 4550. | 4543. | 4562. |
| $H_2$ Partial Pressure, psia | 267.8 | 267.9 | 267.7 | 267.9 | 267.9 | 267.8 | 268.0 |
| HC Partial Pressure, psia | 50.5 | 50.5 | 50.6 | 50.6 | 50.4 | 50.5 | 50.3 |
| H/HC Ratio | 5.3 | 5.3 | 5.3 | 5.3 | 5.3 | 5.3 | 5.3 |
| WHSV | 5.7 | 5.7 | 5.7 | 5.7 | 5.7 | 5.7 | 5.7 |
| Temp, °F. | 950.4 | 950.7 | 950.4 | 950.2 | 950.1 | 950.0 | 949.7 |
| Wt % Recovery | 96.9 | 97.5 | 97.4 | 97.9 | 97.5 | 97.9 | 97.5 |
| $C_5+$ Research Octane No. | 98.3 | 98.1 | 97.8 | 97.6 | 97.4 | 97.2 | 97.0 |
| $C_5+$ Yields, wt % | 81.3 | 82.1 | 82.6 | 83.2 | 83.8 | 84.3 | 84.7 |
| Total Aromatics, wt % | 58.1 | 58.1 | 58.0 | 58.3 | 58.7 | 58.6 | 58.6 |

| Period No. | 8 | 9 | 10 | 11 | 12 | 13 |
|---|---|---|---|---|---|---|
| Period Length, hr | 4.9 | 4.9 | 3.9 | 3.9 | 3.9 | 3.9 |
| Time on Oil, hr | 72.5 | 84.5 | 101.6 | 107.5 | 113.5 | 119.5 |
| Operating Conditions | | | | | | |
| Pressure, psig | 303.7 | 303.7 | 303.7 | 303.8 | 303.7 | 303.7 |
| Recycle Gas Rate, SCFB | 4547. | 4563. | 4554. | 4565. | 4561. | 4519. |
| $H_2$ Partial Pressure, psia | 267.8 | 268.0 | 267.9 | 268.1 | 268.0 | 267.6 |
| HC Partial Pressure, psia | 50.5 | 50.3 | 50.4 | 50.3 | 50.4 | 50.7 |
| H/HC Ratio | 5.3 | 5.3 | 5.3 | 5.3 | 5.3 | 5.3 |
| WHSV | 5.7 | 5.7 | 5.6 | 5.7 | 5.7 | 5.7 |
| Temp, °F. | 949.8 | 949.7 | 941.5 | 941.6 | 941.4 | 941.3 |
| Wt % Recovery | 98.2 | 97.5 | 98.2 | 97.7 | 98.1 | 97.6 |
| $C_5+$ Research Octane No. | 96.7 | 96.8 | 95.6 | 95.4 | 95.5 | 95.2 |
| $C_5+$ Yields, wt % | 85.0 | 85.3 | 86.0 | 86.2 | 86.4 | 86.1 |
| Total Aromatics, wt % | 58.3 | 59.0 | 57.7 | 57.6 | 58.3 | 57.4 |

EXAMPLE V

Two tests containing Catalyst No. I were conducted for comparison purposes. Each of these two test runs, Test No. 3 and Test No. 4, was conducted as described hereinabove in Example III for Test No. 1. The catalyst loadings for each of Tests Nos. 3 and 4 are summarized hereinbelow in Table VII.

TABLE VII

CATALYST LOADING FOR TEST NOS. 3 and 4

| Bed | Catalyst | Wt, gm |
|---|---|---|
| 1 | I | 0.5 |
| 2 | I | 3.0 |
| 3 | I | 13.5 |
| 4 | I | 18.0 |

The operating conditions and the test results for Test No. 3 and Test No. 4 are presented hereinbelow in Table VIII and Table IX, respectively.

TABLE VIII

DATA FROM TEST NO. 3

| Period No. | 1 | 2 | 3 | 4 | 5 | 6 | 7 | 8 | 9 | 10 |
|---|---|---|---|---|---|---|---|---|---|---|
| Period Length, hr | 3.9 | 3.9 | 3.9 | 3.9 | 3.9 | 3.9 | 3.9 | 3.9 | 3.9 | 3.9 |
| Time on Oil, hr | 5.0 | 11.0 | 17.0 | 23.0 | 29.0 | 36.9 | 47.0 | 59.0 | 71.0 | 83.0 |
| Operating Conditions | | | | | | | | | | |
| Pressure, psig | 304.4 | 304.5 | 304.4 | 304.5 | 304.4 | 304.5 | 304.5 | 304.5 | 304.4 | 304.5 |
| Recycle Gas Rate, SCFB | 4586. | 4508. | 4485. | 4482. | 4531. | 4496. | 4630. | 4577. | 4594. | 4468. |
| $H_2$ Partial Pressure, psia | 268.8 | 268.2 | 267.9 | 267.9 | 268.3 | 268.0 | 269.3 | 268.8 | 268.9 | 267.8 |
| HC Partial Pressure, psia | 50.2 | 51.0 | 51.2 | 51.2 | 50.7 | 51.1 | 49.8 | 50.3 | 50.2 | 51.4 |
| H/HC Ratio | 5.4 | 5.3 | 5.2 | 5.2 | 5.3 | 5.3 | 5.4 | 5.4 | 5.4 | 5.2 |
| WHSV | 5.6 | 5.6 | 5.6 | 5.6 | 5.7 | 5.7 | 5.7 | 5.7 | 5.7 | 5.7 |
| Temp, °F. | 949.9 | 949.7 | 949.5 | 949.7 | 949.2 | 949.4 | 950.3 | 950.1 | 950.5 | 949.7 |
| Wt % Recovery | 96.2 | 98.4 | 98.0 | 99.4 | 98.8 | 99.4 | 98.9 | 99.4 | 98.7 | 99.4 |
| $C_5+$ Research Octane No. | 99.6 | 98.8 | 98.4 | 98.1 | 97.7 | 97.7 | 97.6 | 97.5 | 97.5 | 97.1 |
| $C_5+$ Yields, wt % | 81.4 | 82.4 | 83.1 | 83.0 | 83.4 | 83.8 | 84.0 | 84.5 | 84.6 | 85.1 |
| Total Aromatics, wt % | 59.7 | 59.6 | 59.5 | 59.2 | 59.0 | 59.4 | 59.4 | 59.6 | 59.6 | 59.4 |

| Period No. | 11 | 13 | 14 | 15 | 16 | 17 |
|---|---|---|---|---|---|---|
| Period Length, hr | 3.9 | 3.9 | 3.9 | 3.9 | 3.9 | 3.9 |
| Time on Oil, hr | 101.0 | 112.9 | 125.2 | 141.1 | 149.0 | 154.9 |
| Operating Conditions | | | | | | |
| Pressure, psig | 304.4 | 304.5 | 304.5 | 304.5 | 304.6 | 304.6 |
| Recycle Gas Rate, SCFB | 4753. | 4774. | 4773. | 4760. | 4784. | 4775. |
| $H_2$ Partial Pressure, psia | 270.3 | 270.6 | 270.6 | 270.4 | 270.7 | 270.7 |
| HC Partial Pressure, psia | 48.7 | 48.6 | 48.6 | 48.7 | 48.5 | 48.6 |
| H/HC Ratio | 5.6 | 5.6 | 5.6 | 5.6 | 5.6 | 5.6 |
| WHSV | 5.7 | 5.7 | 5.7 | 5.7 | 5.7 | 5.7 |
| Temp, °F. | 940.3 | 941.0 | 919.8 | 919.9 | 920.6 | 921.6 |
| Wt % Recovery | 98.8 | 98.8 | 98.9 | 99.4 | 99.9 | 99.6 |

TABLE VIII-continued
DATA FROM TEST NO. 3

| | | | | | | |
|---|---|---|---|---|---|---|
| $C_5+$ Research Octane No. | 95.1 | 95.2 | 90.7 | 90.5 | 90.5 | 90.5 |
| $C_5+$ Yields, wt % | 86.7 | 86.8 | 89.8 | 90.0 | 89.9 | 89.9 |
| Total Aromatics, wt % | 58.0 | 58.2 | 55.7 | 55.8 | 55.6 | 55.8 |

TABLE IX
DATA FROM TEST NO. 4

| Period No. | 1 | 2 | 3 | 4 | 5 | 6 | 7 | 8 | 9 | 10 |
|---|---|---|---|---|---|---|---|---|---|---|
| Period Length, hr | 3.9 | 3.9 | 3.9 | 5.0 | 4.9 | 4.9 | 4.9 | 4.9 | 4.9 | 4.9 |
| Time on Oil, hr | 5.5 | 11.5 | 17.5 | 24.1 | 36.1 | 48.0 | 60.0 | 101.7 | 108.7 | 115.6 |
| Operating Conditions | | | | | | | | | | |
| Pressure, psig | 303.7 | 303.8 | 303.7 | 303.7 | 303.7 | 303.7 | 303.8 | 303.9 | 303.8 | 303.8 |
| Recycle Gas Rate, SCFB | 4592. | 4592. | 4585. | 4525. | 4572. | 4564. | 4576. | 4578. | 4568. | 4514. |
| $H_2$ Partial Pressure, psia | 268.3 | 268.4 | 268.2 | 267.6 | 268.1 | 268.0 | 268.2 | 268.3 | 268.1 | 267.6 |
| HC Partial Pressure, psia | 50.1 | 50.1 | 50.1 | 50.7 | 50.2 | 50.3 | 50.2 | 50.2 | 50.3 | 50.8 |
| H/HC Ratio | 5.4 | 5.4 | 5.4 | 5.3 | 5.3 | 5.3 | 5.4 | 5.4 | 5.3 | 5.3 |
| WHSV | 5.6 | 5.7 | 5.7 | 5.7 | 5.7 | 5.6 | 5.7 | 5.6 | 5.7 | 5.8 |
| Temp, °F. | 952.3 | 951.1 | 948.5 | 952.5 | 950.2 | 954.3 | 949.2 | 950.4 | 947.6 | 946.9 |
| Wt % Recovery | 96.8 | 97.5 | 97.3 | 98.2 | 97.9 | 98.3 | 97.9 | 98.8 | 99.5 | 99.4 |
| $C_5+$ Research Octane No. | 98.3 | 97.9 | 97.5 | 97.3 | 97.0 | 96.7 | 96.6 | 95.6 | 95.5 | 95.3 |
| $C_5+$ Yields, wt % | 81.4 | 82.6 | 83.2 | 83.3 | 84.2 | 84.4 | 85.0 | 85.3 | 85.4 | 85.5 |
| Total Aromatics, wt % | 58.3 | 58.3 | 58.8 | 58.5 | 58.9 | 58.9 | 59.0 | 58.2 | 57.9 | 57.5 |

| Period No. | 11 | 12 | 13 | 14 | 15 | 16 | 17 |
|---|---|---|---|---|---|---|---|
| Period Length, hr | 3.9 | 3.9 | 3.9 | 3.9 | 3.9 | 3.9 | 3.9 |
| Time on Oil, hr | 125.5 | 131.4 | 137.4 | 143.3 | 149.5 | 155.5 | 161.4 |
| Operating Conditions | | | | | | | |
| Pressure, psig | 303.7 | 303.8 | 303.8 | 303.8 | 303.8 | 303.7 | 303.7 |
| Recycle Gas Rate, SCFB | 4521. | 4558. | 4510. | 4516. | 4561. | 4482. | 4475. |
| $H_2$ Partial Pressure, psia | 267.6 | 268.0 | 267.6 | 267.6 | 268.1 | 267.2 | 267.2 |
| HC Partial Pressure, psia | 50.7 | 50.4 | 50.8 | 50.8 | 50.4 | 51.1 | 51.2 |
| H/HC Ratio | 5.3 | 5.3 | 5.3 | 5.3 | 5.3 | 5.2 | 5.2 |
| WHSV | 5.7 | 5.7 | 5.8 | 5.7 | 5.7 | 5.8 | 5.9 |
| Temp, °F. | 947.9 | 948.3 | 948.1 | 949.1 | 947.5 | 946.8 | 946.8 |
| Wt % Recovery | 98.7 | 99.7 | 99.4 | 98.3 | 97.5 | 98.0 | 97.6 |
| $C_5+$ Research Octane No. | 95.9 | 95.6 | 95.5 | 95.7 | 95.2 | 95.1 | 95.0 |
| $C_5+$ Yields, wt % | 85.2 | 85.4 | 85.4 | 86.6 | 86.7 | 87.1 | 87.3 |
| Total Aromatics, wt % | 58.0 | 57.7 | 57.5 | 58.8 | 58.6 | 58.8 | 58.4 |

EXAMPLE VI

A third test of Catalyst I was conducted in a manner that was similar to that described hereinabove for Test No. 1 in Example III. This test, identified hereinafter as Test No. 5, had a catalyst loading as defined hereinbelow in Table X.

TABLE X
CATALYST LOADING FOR TEST NO. 5

| Bed | Catalyst | Wt, gm |
|---|---|---|
| 1 | I | 0.5 |
| 2 | I | 3.0 |
| 3 | I | 8.5 |
| 4 | I | 18.0 |

The operating conditions employed by, and the test results obtained from, Test No. 5 are presented hereinbelow in Table XI.

TABLE XI
DATA FROM TEST NO. 5

| Period No. | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| Period Length, hr | 3.9 | 3.9 | 3.9 | 3.9 | 3.9 | 3.9 | 3.9 | 3.9 | 4.0 | 4.0 | 4.0 | 4.0 | 4.0 | 4.0 |
| Time on Oil, hr | 5.6 | 11.6 | 17.6 | 23.7 | 29.6 | 35.6 | 41.6 | 47.6 | 54.5 | 60.5 | 66.5 | 77.5 | 83.6 | 89.6 |
| Operating Conditions | | | | | | | | | | | | | | |
| Pressure, psig | 304.3 | 304.3 | 304.3 | 304.3 | 304.3 | 304.3 | 304.3 | 304.3 | 304.3 | 304.3 | 304.3 | 304.3 | 304.3 | 304.3 |
| Recycle Gas Rate, SCFB | 4664. | 4628. | 4615. | 4529. | 4546. | 4528. | 4547. | 4548. | 4626. | 4619. | 4635. | 4591. | 4628. | 4622. |
| $H_2$ Partial Pressure, psia | 269.4 | 269.1 | 269.0 | 268.2 | 268.3 | 268.2 | 268.4 | 268.4 | 269.1 | 269.0 | 269.2 | 268.8 | 269.1 | 269.0 |
| HC Partial Pressure, psia | 49.5 | 49.8 | 49.9 | 50.7 | 50.6 | 50.8 | 50.6 | 50.6 | 49.9 | 49.9 | 49.8 | 50.2 | 49.8 | 49.9 |
| H/HC Ratio | 5.5 | 5.4 | 5.4 | 5.3 | 5.3 | 5.3 | 5.3 | 5.3 | 5.4 | 5.4 | 5.4 | 5.4 | 5.4 | 5.4 |
| WHSV | 5.9 | 5.9 | 6.0 | 6.0 | 6.0 | 6.0 | 6.0 | 6.0 | 5.9 | 5.9 | 5.9 | 5.9 | 5.9 | 5.9 |
| Temp, °F | 950.0 | 949.9 | 951.1 | 949.5 | 950.7 | 949.1 | 949.1 | 949.1 | 948.8 | 949.5 | 948.7 | 941.9 | 942.2 | 942.0 |
| Wt % Recovery | 97.6 | 98.7 | 97.1 | 99.0 | 98.3 | 99.0 | 98.6 | 99.1 | 98.6 | 98.8 | 98.8 | 98.9 | 98.7 | 98.7 |
| $C_5+$ Research Octane No. | 99.2 | 97.8 | 97.5 | 97.3 | 96.7 | 96.5 | 96.3 | 96.5 | 96.4 | 96.2 | 96.4 | 95.1 | 94.9 | 94.6 |
| $C_5+$ Yields, wt % | 81.3 | 82.3 | 82.8 | 83.4 | 83.9 | 84.3 | 84.4 | 84.5 | 84.9 | 85.1 | 84.5 | 86.5 | 86.7 | 86.8 |
| Total Aromatics, wt % | 58.6 | 58.1 | 58.4 | 58.6 | 58.6 | 58.6 | 58.4 | 58.6 | 58.6 | 58.7 | 58.6 | 58.0 | 57.9 | 57.6 |

| Period No. | 15 | 16 | 17 | 18 | 19 | 20 | 21 |
|---|---|---|---|---|---|---|---|
| Period Length, hr | 4.0 | 4.0 | 4.0 | 3.9 | 3.9 | 3.9 | 3.9 |
| Time on Oil, hr | 95.5 | 107.6 | 119.6 | 130.5 | 148.7 | 154.1 | 159.4 |
| Operating Conditions | | | | | | | |
| Pressure, psig | 304.3 | 304.3 | 304.3 | 304.3 | 304.4 | 304.3 | 304.3 |
| Recycle Gas Rate, SCFB | 4627. | 4639. | 4639. | 4548. | 4553. | 4541. | 4538. |
| $H_2$ Partial Pressure, psia | 269.1 | 269.2 | 269.2 | 268.4 | 268.5 | 268.3 | 268.3 |
| HC Partial Pressure, psia | 49.8 | 49.7 | 49.7 | 50.6 | 50.5 | 50.6 | 50.7 |
| H/HC Ratio | 5.4 | 5.4 | 5.4 | 5.3 | 5.3 | 5.3 | 5.3 |
| WHSV | 5.8 | 5.9 | 5.9 | 6.0 | 6.0 | 6.0 | 6.0 |
| Temp, °F | 941.1 | 940.5 | 940.5 | 940.6 | 930.6 | 930.2 | 930.2 |
| Wt % Recovery | 98.5 | 98.9 | 98.6 | 96.3 | 98.6 | 98.6 | 98.8 |
| $C_5+$ Research Octane No. | 94.4 | 94.2 | 94.4 | 93.9 | 92.2 | 92.1 | 92.7 |
| $C_5+$ Yields, wt % | 86.9 | 87.4 | 87.3 | 89.0 | 89.1 | 89.1 | 89.1 |
| Total Aromatics, wt % | 57.5 | 57.5 | 57.2 | 58.5 | 52.4 | 52.4 | 56.1 |

Figure 2:
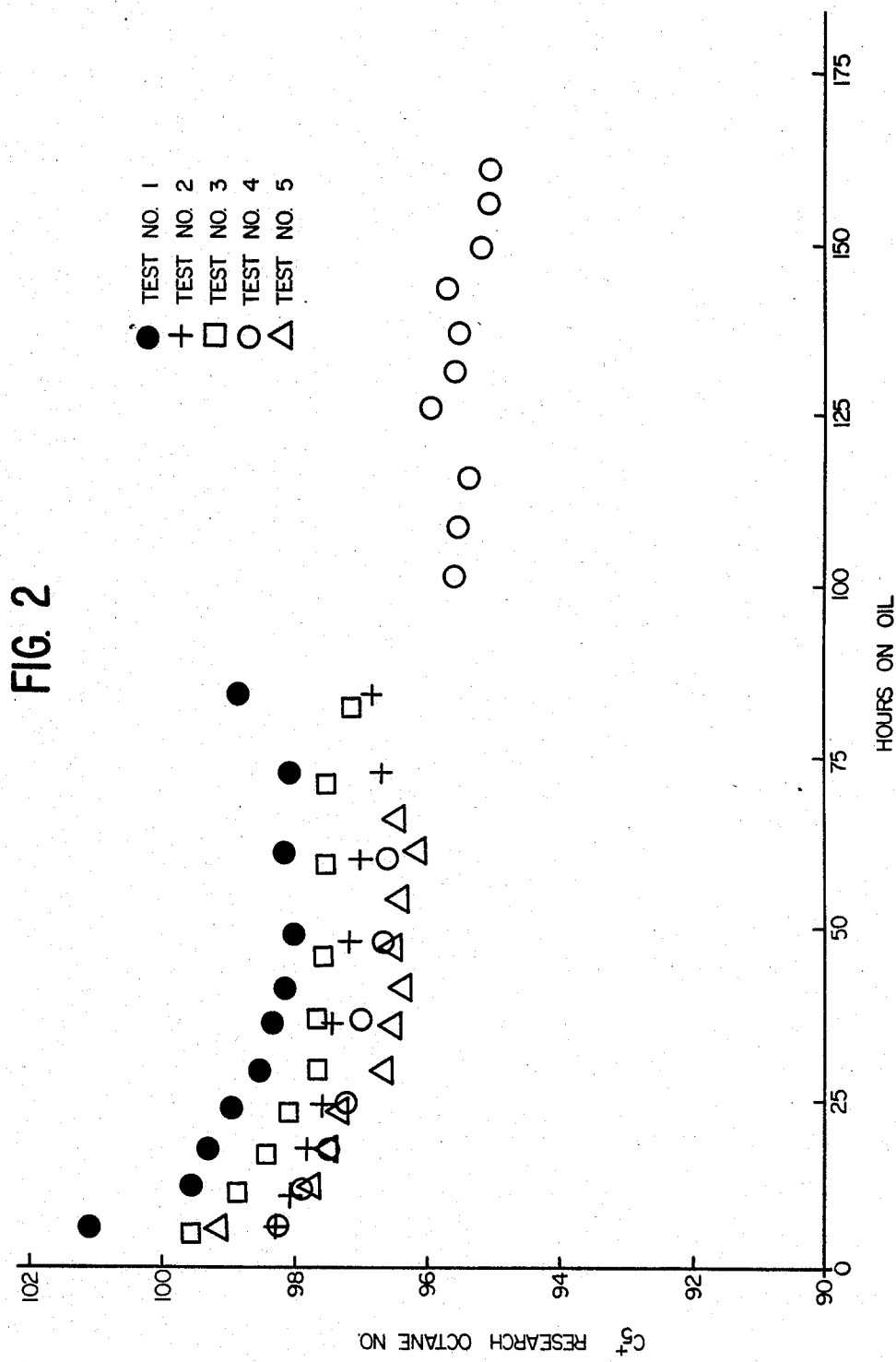
FIG. 2 compares the $C_5+$ research octane numbers obtained from two reforming test runs, each of which runs employed the catalyst of the present invention as the second catalyst in a two-catalyst system, to those obtained from three reforming test runs, each of which employed as its sole catalyst a conventional reforming catalyst comprising platinum, rhenium, and combined chlorine on a support of catalytically-active alumina.
Figure 3:
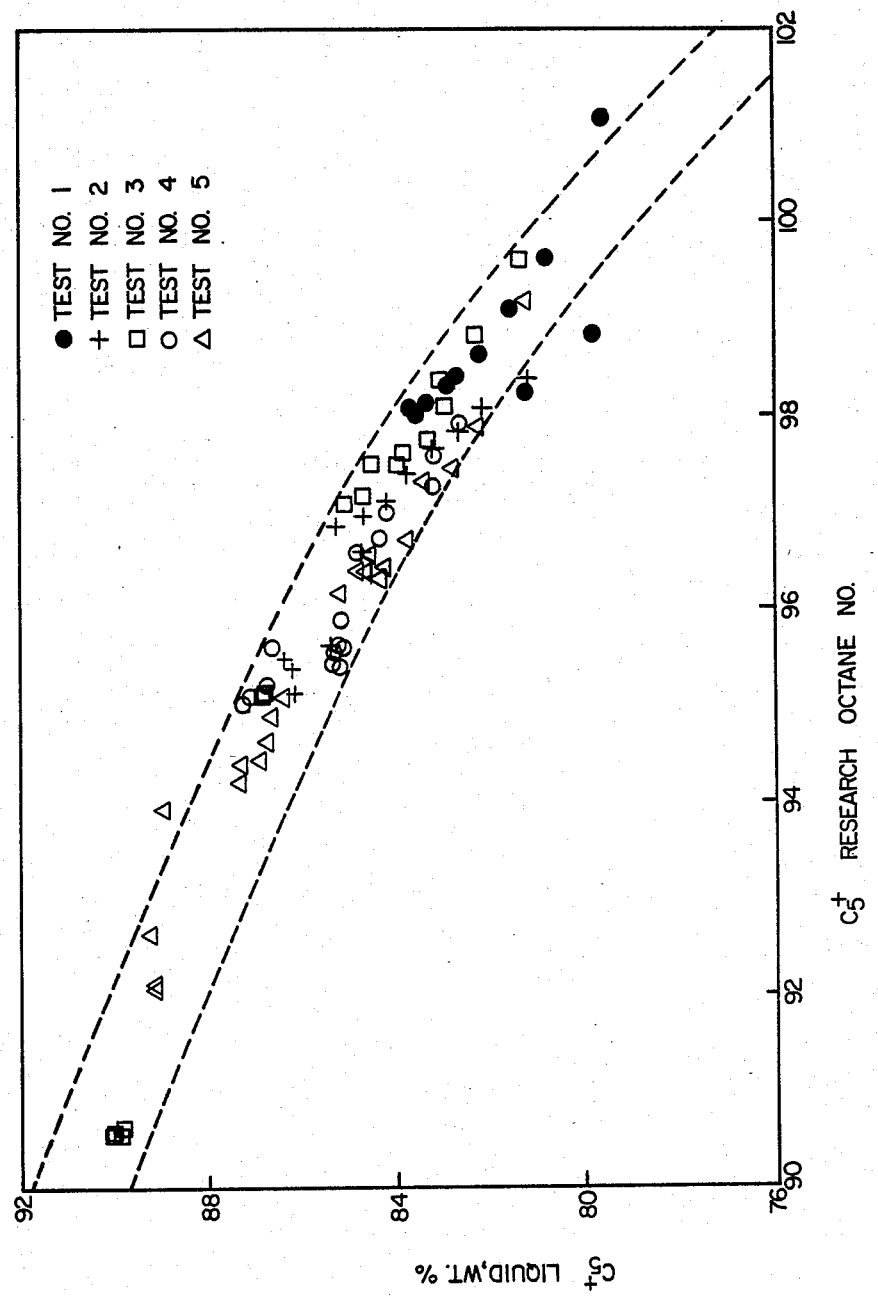
FIG. 3 compares the $C_5+$ liquid yields obtained from the above test runs.

The activities of the catalyst systems in the tests performed in Examples III through VI are presented in FIG. 2. The activity of each catalyst system is expressed in terms of $C_5^+$ research octane number. The accompanying FIG. 3 presents the $C_5^+$ liquid yields, in terms of wt%, for each of the above-described test runs. The accompanying FIG. 4 presents the total aromatics data for each of the test runs. The broken lines drawn in FIGS. 3 and 4 represent and determine the 90% confidence intervals for Test Runs Nos. 3, 4, and 5, each of which employed the commercially-prepared reforming catalyst, Catalyst I, as the sole catalyst.

Examination of the data in these figures reveals that the catalyst system of the present invention, i.e., a catalyst system containing the catalyst of the present invention in the tail reactor, provides an activity that is superior to the conventional platinum- and rhenium-containing catalyst, when the catalyst of the present invention makes up about 10 wt% of the total catalyst being employed to reform the naphtha feedstock. The data also show that $C_5^+$ liquid yields and aromatics product are not deleteriously affected by a catalyst system which contains the conventional reforming catalyst followed by a catalyst containing AMS-1B crystalline borosilicate material that is separate from catalyst particles containing the Group VIII noble metal. Therefore, the process of the present invention, employing the catalyst of the present invention in the tail reactor, provides an improved reforming process.

What is claimed is:

1. A process for the reforming of a hydrocarbon stream, which process comprises contacting said hydrocarbon stream in a first reforming zone in the presence of hydrogen and under reforming conditions with a first catalyst to provide a partially-reformed effluent and contacting said partially-reformed effluent in a second reforming zone under reforming conditions and in the presence of hydrogen with a second catalyst to provide a reformed effluent having a high octane number, said first catalyst comprising at least one noble metal of Group VIII of the Periodic Table of Elements and a combined halogen on a porous, refractory inorganic oxide support, said second catalyst comprising a physical particle-form mixture of a Component A and a Component B, said Component A comprising at least one noble metal of Group VIII deposed on a solid catalyst support material providing acidic catalytic sites, said Component B consisting essentially of a crystalline borosilicate molecular sieve, said catalyst having been prepared by thoroughly and intimately blending finely-divided particles of said Components A and B to provide a thoroughly-blended composite, and said Component B being present in an amount within the range of about 0.1 wt% to about 25 wt%, based upon the weight of said second catalyst.

2. The process of claim 1, wherein said reforming conditions comprise an inlet temperature within the range of about 399° C. (750° F.) to about 549° C. (1,020° F.), a pressure within the range of about 446 kPa (50 psig) to about 6,996 kPa (1,000 psig), a WHSV within the range of about 0.5 weight unit of hydrocarbon per hour per weight unit of catalyst to about 10 weight units of hydrocarbon per hour per weight unit of catalyst, a hydrogen recycle rate within the range of about 267 m³/m³ (1,500 SCFB) to about 2,670 m³/m³ (15,000 SCFB), and a hydrogen-to-hydrocarbon mole ratio within the range of about 1 to about 30, and said stream is a member selected from the group consisting of a virgin naphtha, a cracked naphtha, a hydrocarbon fraction boiling in the gasoline boiling range, and mixtures thereof.

3. The process of claim 1, wherein said solid catalyst support material of said Component A of said second catalyst comprises a catalytically-active alumina and a combined halogen, said halogen being chlorine or fluorine and being present in an amount within the range of about 0.1 wt% to about 4 wt%, calculated as the element and based upon the weight of Component A, said Group VIII noble metal of said Component A is platinum and said platinum is present in an amount within the range of about 0.1 wt% to about 3 wt%, calculated as the element and based upon the weight of said Component A, and said crystalline borosilicate molecular sieve is an AMS-1B crystalline borosilicate comprising a molecular sieve material providing an X-Ray diffraction pattern comprising the following X-Ray diffraction lines and assigned strengths:

| Interplanar Spacing d, Å | Assigned Strength |
|---|---|
| 11.2 ± 0.2 | W-VS |
| 10.0 ± 0.2 | W-MS |
| 5.97 ± 0.07 | W-M |
| 3.82 ± 0.05 | VS |
| 3.70 ± 0.05 | MS |
| 3.62 ± 0.05 | M-MS |
| 2.97 ± 0.02 | W-M |
| 1.99 ± 0.02 | VW-M | and having the following composition in terms of mole ratios of oxides:

$$0.9 \pm 0.2 M_{2/n}O:B_2O_3:YSiO_2:ZH_2O,$$

wherein M is at least one cation having a valence of n, Y is a value within the range of about 4 to about 600, and Z is a value within the range of 0 to about 160.

4. The process of claim 2, wherein said solid catalyst support material of said Component A of said second catalyst comprises a catalytically-active alumina and a combined halogen, said halogen being chlorine or fluorine and being present in an amount within the range of about 0.1 wt% to about 4 wt%, calculated as the element and based upon the weight of Component A, said Group VIII noble metal of said Component A is platinum and said platinum is present in an amount within the range of about 0.1 wt% to about 3 wt%, calculated as the element and based upon the weight of said Component A, said Component A comprises further rhenium, said rhenium being present in an amount within the range of about 0.1 wt% to about 3 wt%, calculated as the element and based upon the weight of Component A, and said crystalline borosilicate molecular sieve is an AMS-1B crystalline borosilicate comprising a molecular sieve material providing an X-Ray diffraction pattern comprising the following X-Ray diffraction lines and assigned strengths:

| Interplanar Spacing d, Å | Assigned Strength |
|---|---|
| 11.2 ± 0.2 | W-VS |
| 10.0 ± 0.2 | W-MS |
| 5.97 ± 0.07 | W-M |
| 3.82 ± 0.05 | VS |
| 3.70 ± 0.05 | MS |
| 3.62 ± 0.05 | M-MS |
| 2.97 ± 0.02 | W-M |

| Interplanar Spacing d, Å | Assigned Strength |
| --- | --- |
| 1.99 ± 0.02 | VW-M | and having the following composition in terms of mole ratios of oxides:

$$0.9 \pm 0.2 M_{2/n}O : B_2O_3 : YSiO_2 : ZH_2O,$$

wherein M is at least one cation having a valence of n, Y is a value within the range of about 4 to about 600, and Z is a value within the range of 0 to about 160.

5. The process of claim 4, wherein said Component B of said second catalyst is present in an amount within the range of about 0.5 wt% to about 5 wt%, based upon the weight of said second catalyst.

6. In a process for the reforming of a hydrocarbon stream selected from the group consisting of a virgin naphtha, a cracked naphtha, a hydrocarbon fraction boiling in the gasoline boiling range, and mixtures thereof, wherein said stream is first contacted in a first reaction zone with a first reforming catalyst under reforming conditions and in the presence of hydrogen to provide a partially-reformed effluent and at least a portion of said partially-reformed effluent is contacted in a second reaction zone under reforming conditions and in the presence of hydrogen with a second reforming catalyst comprising a Group VIII noble metal and a crystalline molecular sieve to provide a reformate having a high octane number, the improvement which comprises using as said second reforming catalyst a catalyst comprising a physical particle-form mixture of a Component A and a Component B, said Component A comprising at least one Group VIII noble metal deposed on a solid catalyst support material providing acidic catalytic sites, said Component B consisting essentially of a crystalline borosilicate molecular sieve, and said second catalyst having been prepared by thoroughly and intimately blending finely-divided particles of said Components A and B to provide a thoroughly-blended composite 7. The process of claim 6, wherein said Component A of said second catalyst comprises a catalytically-active alumina and a combined halogen, said halogen being chlorine or fluorine and being present in an amount within the range of about 0.1 wt% to about 4 wt%, calculated as the element and based upon the weight of Component A, said Group VIII noble metal of said Component A is platinum and said platinum is present in an amount within the range of about 0.1 wt% to about 3 wt%, calculated as the element and based upon the weight of said Component A, and said crystalline borosilicate molecular sieve is an AMS-1B crystalline borosilicate comprising a molecular sieve material providing an X-Ray diffraction pattern comprising the following X-Ray diffraction lines and assigned strengths:

| Interplanar Spacing d, Å | Assigned Strength |
| --- | --- |
| 11.2 ± 0.2 | W-VS |
| 10.0 ± 0.2 | W-MS |
| 5.97 ± 0.07 | W-M |
| 3.82 ± 0.05 | VS |
| 3.70 ± 0.05 | MS |
| 3.62 ± 0.05 | M-MS |
| 2.97 ± 0.02 | W-M |
| 1.99 ± 0.02 | VW-M | and having the following composition in terms of mole ratios of oxides:

$$0.9 \pm 0.2 M_{2/n}O : B_2O_3 : YSiO_2 : ZH_2O,$$

wherein M is at least one cation having a valence of n, Y is a value within the range of about 4 to about 600, and Z is a value within the range of 0 to about 160.

8. The process of claim 7, wherein said Component B of said second catalyst is present in an amount within the range of about 0.5 wt% to about 5 wt%, based upon the weight of said second catalyst.

9. The process of claim 7, wherein said Component A of said second catalyst comprises further rhenium, said rhenium being present in an amount within the range of about 0.1 wt% to about 3 wt%, calculated as the element and based upon the weight of said Component A.

* * * * *